United States Patent [19]

Kangle et al.

[11] 3,964,862

[45] June 22, 1976

[54] PROCESS FOR DYEING AND PRINTING TEXTILE MATERIALS OF SYNTHETIC ORGANIC FIBERS

[75] Inventors: Purushottam Janardan Kangle, Goregaon-Bombay, India; Hermann Werdenberg, Basel, Switzerland; Klaus Artz, Muttenz, Switzerland; Visvanathan Ramanathan, Basel, Switzerland; Navnitrai Nagirji Naik, Goregaon-Bombay, India; Branimir Milicevic, Riehen, Switzerland

[73] Assignee: Ciba-Geigy AG, Basel, Switzerland

[22] Filed: Sept. 21, 1973

[21] Appl. No.: 399,659

Related U.S. Application Data

[63] Continuation of Ser. No. 250,494, May 5, 1972, abandoned, which is a continuation of Ser. No. 41,094, May 27, 1970, abandoned.

[30] Foreign Application Priority Data

June 3, 1969   Switzerland.......................... 8411/69

[52] U.S. Cl............................................ 8/176; 8/179; 8/65
[51] Int. Cl.$^2$........................................... D06P 3/00
[58] Field of Search .............. 8/65, 61, 72, 179, 176

[56] References Cited
UNITED STATES PATENTS

| | | | |
|---|---|---|---|
| 3,265,461 | 8/1966 | Luetzel et al....................... | 8/179 X |
| 3,414,368 | 12/1968 | Kitamura et al.......................... | 8/65 |
| 3,480,378 | 11/1969 | Taube et al.............................. | 8/179 |
| 3,671,181 | 6/1972 | Feess et al............................ | 8/62 X |

FOREIGN PATENTS OR APPLICATIONS

471,326   4/1966   Japan

OTHER PUBLICATIONS

Knecht et al., *Principals & Practice of Textile Painting*, pp. 275–277, 289, 491–493, Chas. Griffin & Co., Ltd., London, England.

*Primary Examiner*—Samuel Feinberg
*Assistant Examiner*—Peter A. Nelson
*Attorney, Agent, or Firm*—Joseph G. Kolodny; Edward McC. Roberts; Prabodh I. Almaula

[57] ABSTRACT

A process for dyeing and printing textile materials made of or containing fully synthetic hydrophobic linear polymers which are free from amino groups, wherein the material is padded with a dispersion dyestuff containing at least one carboxyl group, the padded textile material is dried and printed with an alkaline printing paste, the fabric is thermo-fixed and the salt of the dyestuff containing a carboxyl group is subsequently washed from the printed areas.

12 Claims, No Drawings

PROCESS FOR DYEING AND PRINTING TEXTILE MATERIALS OF SYNTHETIC ORGANIC FIBERS

This is a continuation of application Ser. No. 250,494, filed on May 5, 1972, which in turn is a continuation of application Ser. No. 41,094, filed May 27, 1970, now abandoned.

The present invention relates to a process for the multi-colour printing of textile materials which consist of or contain hyrophobic synthetic organic fibres. What has in fact been found is that reserve effects can be obtained on textile materials made of such fibres.

The invention is based on the observation that textile materials made of fully synthetic hyrophobic linear polymers which are free from amino groups, can be dyed or printed by a process wherein the textile material is padded with a dyestuff containing at least one carboxyl group, the padded textile material is dried and printed with an alkaline printing paste which can contain an optical brightener free from carboxyl groups, a white pigment free from carboxyl groups or another dyestuff free from carboxyl groups, the fabric is heat-fixed and subsequently the salt of the dyestuff containing a carboxyl group is washed from the printed areas.

Synthetic fibres which can be dyed and printed by the process according to the invention that may be mentioned are acrylic fibres of polyacrylonitrile and of copolymers of acrylonitrile and other vinyl compounds, for example acrylate esters, acrylamides, vinyl chloride or vinylidene chloride; copolymers of dicyanoethylene and vinyl acetate and also acrylonitrile block copolymers; fibres of polyurethanes, fibres based on a polyepoxy or polyolefine fibres, for example polypropylene, especially polypropylene modified by nickel or unmodified polypropylene, and especially fibres of aromatic polyesters, for example those from terephthalic acid and ethylene glycol or 1,4-dimethyol-cyclohexane, and copolymers of terephthalic acid and isophthalic acid and ethylene glycol, as well as cellulose triacetate and 2½-acetate. The fibres to be printed must not contain any free amino groups.

Mixed fabrics of the above mentioned fibres and hydrophilic fibres, especially cellulose fibres and, for example polyester-cotton and polyesterwool mixtures.

The textile materials are generally in the form of woven fabrics, knitted fabrics or other two-dimensional structures, for example fleece materials (non-wovens).

Particularly suitable dyestuffs are disperse dyestuffs, as defined in the Colour Index. The dyestuffs must not contain any sulphonic acid groups. Dispersion dyestuffs free from carboxyl groups may also be mixed with the dispersion dyestuffs containing carboxyl groups in order to produce special reserve effects.

On the other hand, the dyestuffs containing carboxyl groups can be in the form of salts of volatile organic bases or of ammonium salts.

From a chemical point of view, any desired type of dyestuff can be used in the new process, provided the dyestuff possesses at least one carboxylic acid group. The dyestuffs to be used according to the invention can for example belong to the series of the metal-containing or metal-free monoazo or polyazo dyestuffs or (azo)methine dyestuffs, the azaporphine dyestuffs, and especially the anthraquinone dyestuff series, as well as condensation products of the latter which contain more than three fused rings; further suitable dyestuffs are those of the oxazine, nitro, diphenylamino, naphthalic acid, diphenylmethane and triphenylmethane series, naphtholactam condensation dyestuffs and dyestuffs based on naphthoquinone and naphthoquinon-imine as well as other condensation dyestuffs. In addition to the carboxylic acid group or groups required in accordance with the definition, the dyestuffs can contain further customary substituents, for example halogen or alkyl, cycloalkyl, aralkyl, aryl, alkoxy, aryloxy, nitro, sulphone or optionally substituted sulphonamide groups, optionally substituted or acylated amino groups, alkylthio and arylthio, hydroxy, hydroxyalkoxy, cyano and cyanoalkyl radicals, as well as substituted alkyl, aryl or aralkyl radicals and the like.

The dyestuffs contain one or more carboxylic acid groups which are linked to an aromatic nucleus of the dyestuff basic skeleton itself or to aryl, aralkyl or aliphatic groupings in a side chain. The number of the carboxyl groups is in general 1 to 8 and preferably 1 to 4.

Dyestuffs containing carboxyl groups are known in large numbers and may be manufactured in known manner by converting the corresponding dyestuff precursor which contains one or more carboxyl groups bound to the nucleus or in a side chain to the desired end product whilst preserving the carboxyl groups, and if desired carrying out further conversion reactions with the end products. In the case of azo dyestuffs, the customary conversion reactions are diazotisation and coupling as well as condensation, and in most other dyestuff classes they are condensation reactions. As examples of suitable azo dyestuffs containing carboxyl groups, the following compounds may be mentioned:

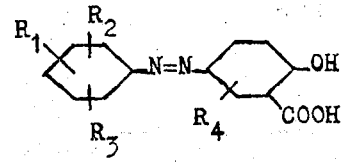

$R_1$, $R_2$, $R_3$ = H, $CH_3$, $C_2H_5$, $OCH_3$, $OC_2H_5$, Cl, Br, $OCH_2COOR$, $NO_2$, COOH, $OCH_2COOH$, COOR (R = alkyl) ($R_4$ = alkyl)

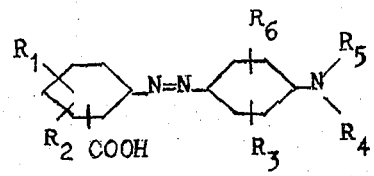

$R_1$, $R_2$ = H, $CH_3$, Cl, Br, $NO_2$, $OCH_3$, $R_3$, $R_6$ = H, $CH_3$, $OCH_3$, $OC_2H_5$, $R_4$, $R_5$ = H, $CH_3$, $C_2H_5$, $CH_2CH_2OH$, $CH_2CH_2OR_7$ ($R_7$ = acyl radical) and other substituted alkyl groups free from amino groups.

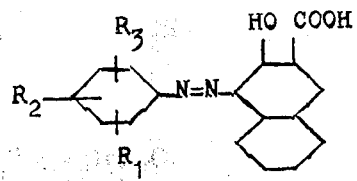

3

$R_1, R_2, R_3$ = H, $CH_3$, $C_2H_5$, $OCH_3$, $OC_2H_5$, Cl, Br, $NO_2$, COOH

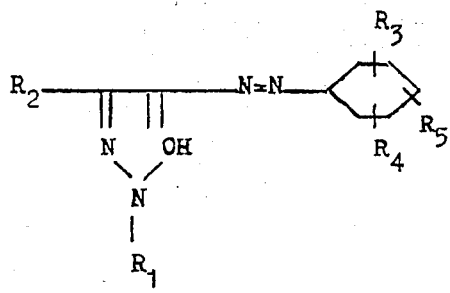

$R_1$ = $C_2H_5$, $CH_2CH_2OH$, $C_6H_5$, $C_6H_4Cl$, $C_6H_4COOH$, $R_2$ = $CH_3$, COOH, $R_3$, $R_4$, $R_5$ = H, $CH_3$, $C_2H_5$, $OCH_3$, $OC_2H_5$, $OCH_2COOH$, COOH, COOR, $OCH_2COOR$, $NO_2$, Cl, Br, CN (R = alkyl)

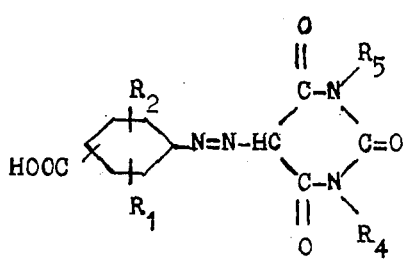

$R_1$, $R_2$ = H, $CH_3$, $C_2H_5$, $OCH_3$, $OC_2H_5$, $R_4$, $R_5$ = $CH_3$, $C_2H_5$, $CH_2CH_2OH$

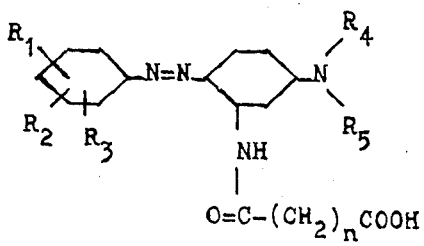

$R_1$, $R_2$, $R_3$ = H, $CH_3$, $C_2H_5$, $OCH_3$, $OC_2H_5$, $OCH_2COOH$, COOH, $OCH_2COOR$, COOR, $NO_2$, Cl, Br, CN, $R_4$, $R_5$ = $CH_3$, $C_2H_5$, $CH_2OH_2OH$, $CH_2$, $CH_2OR$ (R = alkyl) and other substituted alkyl groups free of amino groups, n = 0, 1, 2, 3

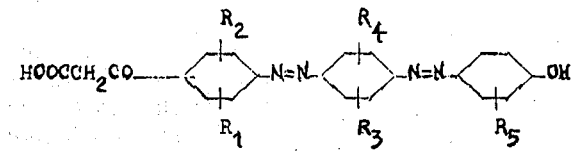

$R_1$, $R_2$ = H, OH, $OCH_3$, Cl, $NO_2$, $CH_3$, $R_3$, $R_4$ = H, $CH_3$, $C_2H_5$, $OCH_3$, $OC_2H_5$, $R_5$ = H, $CH_3$, $OCH_3$, COOH

4

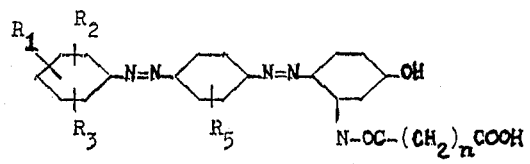

$R_1, R_2, R_3$ = H, $CH_3$, $C_2H_5$, Cl, Br, $OCH_2COOH$, $OCH_3COOR$, COOH (R = alkyl), $R_4$, $R_5$ = H, $CH_3$, $C_2H_5$, $OCH_3$, $OC_2H_5$, n = 0, 1, 2

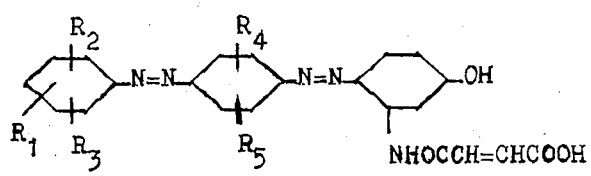

$R_1, R_2, R_3$ = H, $CH_3$, $C_2H_5$, Cl, Br, $OCH_2COOH$, $OCH_3COOR$, COOH (R = alkyl), $R_4$, $R_5$ = H, $CH_3$, $C_2H_5$, $OCH_3$, $OC_2H_5$

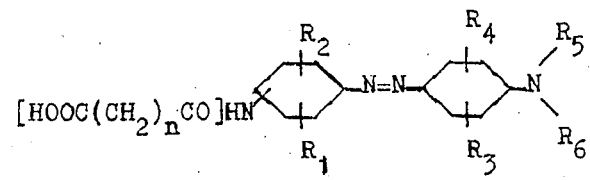

$R_1$, $R_2$ = H, $CH_3$, Cl, Br, $NO_2$, $OCH_3$, $R_3$, $R_4$ = H, $CH_3$, $OCH_3$, $OC_2H_5$, NHCO, $(CH_2)_n$ COOH, NHCOCH=CHCOOH,

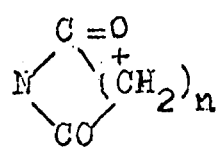

$R_5$, $R_6$ = H, $CH_3$, $C_2H_5$, $CH_2CH_2OH$, $CH_2CH_2OR_7$ ($R_7$ = aryl radical) and other substituted alkyl groups free of amino groups, n=0,1,2,3

$R_1, R_2, R_3, R_4, R_5 = H, CH_3, C_2H_5, OCH_3$

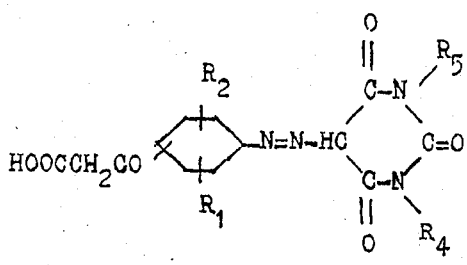

$R_1, R_2 = H, CH_3, C_2H_5, OCH_3, OC_2H_5, NO_2, Cl, Br, R_4, R_5 = CH_3, C_2H_5, CH_2CH_2OH$.

The following diazo components can for example be used for the synthesis of such azo dyestuffs and other azo dyestuffs: 2-aminothiazole, 2-amino-5-nitro-thiazole, 2-amino-5-methylsulphonyl-thiazole, 2-amino-5-cyanothiazole, 2-amino-4-methyl-5-nitro-thiazole, 2-amino-4-methylthiazole, 2-amino-4-phenyl-thiazole, 2-amino-4-(4′-chloro)-phenylthiazole, 2-amino-4-(4′-nitro)-phenylthiazole, 3-aminopyridine, 3-aminoquinoline, 3-aminopyrazole, 3-amino-1-phenylpyrazole, 3-aminoindazole, 3-amino-1,2,4-triazole, 5-(methyl-, ethyl-, phenyl- or benzyl)-1,2,4-triazole, 3-amino-1-(4′-methoxyphenyl)-pyrazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 2-amino-6-thiocyanatobenzthiazole, 2-amino-6-nitrobenzthiazole, 2-amino-6-carbethoxybenzthiazole, 2-amino-(4- or 6)-methylsulphonylbenzthiazole, 2-amino-1,3,4-thiadiazole, 2-amino-1,3,5-thiadiazole, 2-amino-4-phenyl- or -4-methyl-1,3,5-thiadiazole, 2-amino-5-phenyl-1,3,4-thiadiazole, 2-amino-3-nitro-5-methylsulphonyl-thiophene, 2-amino-3,5-bis(methylsulphonyl)-thiophene, 5-amino-3-methyl-isothiazole, 2-amino-4-cyano-pyrazole, 2-(4′-nitrophenyl)-3-amino-4-cyanopyrazole, 3- or 4-aminophthalimide, aminobenzene, 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyanobenzene, 1-amino-4-methylsulphonylbenzene, 1-amino-4-carbalkoxybenzene, 1-amino-2,4-dichlorobenzene, 1-amino-2,4-dibromobenzene, 1-amino-2-methyl-4-chlorobenzene, 1-amino-2-trifluoromethyl-4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-bromo-4-nitrobenzene, 1-amino-2-chloro-4-carbethoxybenzene, 1-amino-2-chloro-4-methylsulphonylbenzene, 1-amino-2-methylsulphonyl-4-chlorobenzene, 1-amino-2,4-dinitro-6-methylsulphonylbenzene, 1-amino-2,4-dinitro-6-(2′-hydroxyethylsulphonyl)-benzene, 1-amino-2,4-dinitro-6-(2′-chloroethylsulphony)-benzene, 1-amino-2-methylsulphonyl-4-nitrobenzene, 1-amino-2-methylsulphinyl-4-nitrobenzene, 1-amino-2,4-dinitrobenzene, 1-amino-2,4-dicyanobenzene, 1-amino-2-cyano-4-methylsulphonyl-benzene, 1-amino-2,6-dichloro-4-cyanobenzene, 1-amino-2,6-dichloro-4-nitrobenzene, 1-amino-2,4-dicyano-6-chlorobenzene, 4-aminobenzoic acid cyclohexyl ester, 1-amino-2,4-dinitro-6-chlorobenzene and especially 1-amino-2-cyano-4-nitrobenzene, 1-aminobenzene-2-, -3- or -4-sulphonic acid amides, for example the N-methylamide or N,N-dimethylamide or N,N-diethylamide, N,γ-isopropoxypropyl-2-aminonaphthalene-6-sulphonic acid amide, N,γ-isopropoxypropyl-1-aminobenzene-2-, -3- or -4-sulphonic acid amide, N-isopropyl-1-aminobenzene-2-, -3-, or -4-sulphonic acid amido, N,γ-methoxypropyl-1-aminobenzene-2-, -3-, or -4-sulphonic acid amide, N,N-bis-(β-hydroxyethyl)-1-aminobenzene-2-, -3- or -4-sulphonic acid amide, 1-amino-4-chlorobenzene-2-sulphonic acid amide and the N-substituted derivatives thereof, 2-, 3- or 4-aminophenylsulphamate, 2-amino-4-, -5- or -6-methylphenylsulphamate, 2-amino-5-methoxyphenylsulphamate, 3-amino-6-chlorophenylsulphamate, 3-amino-2,6-dichlorophenylsulphamate, 4-amino-2-or -3-methoxyphenylsulphamate, N,N-dimethyl-2-aminophenylsulphamate, N,N-di-n-butyl-2-aminophenylsulphamate, N,N-dimethyl-2-amino-4-chlorophenylsulphamate, N,n-propyl-2-aminophenylsulphamate, N,N-di-n-butyl-3-aminophenylsulphamate, O-(3-aminophenyl)-N-morpholine-N-sulphonate, O-(3-aminophenyl)-N-piperidine-sulphonate, N-cyclohexyl-O-3-aminophenyl)-sulphamate, N-(N-methylaniline)-O-(3-aminophenyl)-sulphonate, N,N-diethyl-3-amino-6-methylphenylsulphamate, N-ethyleneimine-O-(4-aminophenyl)-sulphonate, N,N-dimethyl-4-aminophenylsulphamate, O-(n-propyl)-O-(3-aminophenyl)-sulphonate, O,β-chloroethyl-O-(2-aminophenyl)-sulphonate, O-benzyl-O-(3-aminophenyl)-sulphonate and O-ethyl-O-(4-amino-2,6-dimethylphenyl)-sulphonate.

4-Aminoazabenzenes which can be used as diazo components are, for example, 4-aminoazobenzene, 4-amino-2-nitroazobenzene, 3,2′-dimethyl-4-aminoazobenzene, 2-methyl-5-methoxy-4-aminoazobenzene, 2,5-dimethoxy-4-aminoazobenzene, 4′-methoxy-4-aminoazobenzene, 2-methyl-4′-methoxy-4-aminoazobenzene, 3,6,4′-trimethoxy-4-aminoazobenzene, 4′-chloro-4-aminoazobenzene, 2′- or 3′-chloro-4-aminoazobenzene, 3-nitro-4-amino-2′,4′-dichloroazobenzene and 4-aminoazobenzene-4′-sulphonic acid amide, as well as 1-aminobenzene-2-carboxylic acid, 1-aminobenzene-3-carboxylic acid, 1-aminobenzene-4-carboxylic acid, 1-amino-4-nitrobenzene-2-carboxylic acid, 1-amino-3-chlorobenzene-4-carboxylic acid, 1-amino-2-chlorobenzene-4-carboxylic acid, 1-amino-4-phenoxyacetic acid, 1-amino-3-phenoxyacetic acid, 1-amino-3-chloro-4-phenoxyacetic acid, 1-amino-4-hydroxybenzene-3-carboxylic acid and 5-amino-1,2,4-triazole-3-carboxylic acid.

Suitable coupling components of the synthesis of the azo dyestuffs to be used according to the invention are, for example, those of the benzene, naphthalene, pyrazolone, acylacetic acid amide, aminopyrazole and hydroxyquinoline or aminoquinoline series. From amongst the large number of usable components, the following may be mentioned as a selection: 1-Phenyl-3-methyl-5-pyrazolone and the derivatives thereof which are substituted in the phenyl nucleus, for example by the substituents mentioned above, 1-phenyl-5-pyrazolone-3-carboxylic acid and its esters, especially the esters with lower aliphatic alcohols, as well as the derivatives thereof which are further substituted in the phenyl nucleus, for example the 3′- or 4′-carboxyphenyl compounds; 1-phenyl-3-methyl-5-aminopyrazole, as well as the derivatives thereof which are further substituted in the phenyl nucleus, for example 3′- or 4′-carboxyphenyl compounds; acetoacetic acid alkylamides, aralkylamides and arylamides, as well as the derivatives thereof which are further substituted at the aralkyl and aryl radicals, for example by —COOH groups; α- and β-naphthylamine, as well as the derivatives thereof which are further substituted in the naphthyl nucleus, for example by —COOH; α- and β-naphthol, and the derivatives thereof which are further substituted in the aryl nucleus, especially 2,3-hydroxynaphthoic acid and its nuclear substitution products; 8-hydroxyquinoline; aniline derivatives, for example alkyl-, aralkyl- and/or aryl-substituted anilines, or their nuclear substitution products, for example 1-N,N-dimethylamino3-aminobenzene, 1-N,N-diethylamino-3-aminobenzene, 1-N,N-di-β-cyanoethylamino-3-aminobenzene, 1-N,N-di-β-hydroxyethylamino-3-aminobenzene, 1-N,N-di-β-hydroxyethylamino-2-methoxy- or -2-ethoxy-5-aminobenzene, 1-N-methylN-ethylamino-3-aminobenzene, 1-N-β-cyanoethyl-N-β-hydroxyethylamino-3-aminobenzene, 1-N-β-cyanoethyl-N-methyl- or -N-ethylamino-3-aminobenzene, 1-N-ethyl-N-β,γ-dihydroxypropylamino-2-methoxy-5-aminobenzene, 1-N,N-di-β-hydroxypropylamino-3-aminobenzene, 1-N-β-cyano-β-(trifluoromethyl)-ethylamino-3-aminobenzene, 1 -Nβ-hydroxy-β-(trifluoromethyl)-ethylamino-3-aminobenzene, 1-amino-2,5-dimethoxybenzene, 1-amino-2-methyl-5-methoxybenzene, 1-amino-2,5-dimethylbenzene, 1-aminobenzene, 1-amino-2-methoxybenzene, 1-amino-2-methylbenzene and 1-amino-3-methylbenzene, and also the coupling components of the formula

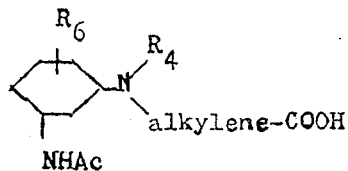

NHAc (a)

(Ac = OCCH₃, OCCH₂CH₃, OC(CH₂)ₙ COOH, OCCH=CH-COOH, and n = an integer), wherein R₆

(b)

denotes hydrogen, alkyl or alkoxy and R₄ represents hydrogen or a substituent, for example 1-(N-methylor -ethyl- or -propyl- or -isopropyl-N-β-carboxy-, carbethoxyethyl)-amino-3-aminobenzene as well as the derivatives which are further substituted by methyl or methoxy in the 6-position, 1-N,N-di-(β-carboxyethyl)-amino-3-aminobenzene as well as the derivatives which are further substituted by methyl, methoxy or ethoxy in the 6-position, 1-(N-β-cyanoethyl- or -β-chloroethyl-N-β-carboxyethyl)-amino-3-aminobenzene as well as the derivatives which are further substituted by methyl or methoxy in the 6-position, and also 1-(N-β-methoxy- or -ethoxy- or propoxy-carbonyloxyethyl)-amino-3-aminobenzene as well as the derivatives thereof which are further substituted by methyl or methoxy in the 6-position, 1-N,N-di-(β-methoxyor -ethoxy- or -propoxy-carbonyloxyethyl)-amino-3-aminobenzene as well as the derivatives thereof which are further substituted by methyl or methoxy in the 6-position, 1-(N-β-cyanoethyl- or -β-chloroethyl-N-β-methoxy- or -ethoxycarbonyloxyethyl)-amino-3-aminobenzene as well as the derivatives thereof which are further substituted by methyl or methoxy in the 6-position.

Azo dyestuffs of the above constitution containing carboxyl groups and also those of different structure, as well as anthraquinone dyestuffs containing carboxyl groups, and condensation products of the latter and dyestuffs of other classes containing carboxyl groups, are described in numerous patent specifications. By way of a selection, attention is directed to the following patents: German Reich Patents Nos. 261,885, 433,848, 455,823, 502,554, 638,835, 654,615, 677,860 and 695,033, German Federal Patents Nos. 1,048,374 and 1,117,233, German Specifications Nos. 1,049,821, 1,143,481 and 1,156,525 open to inspection, Swiss Patent No. 154,707, British Patent No. 794,177, French Patents Nos. 791,119, 847,706, 1,213,082, 1,255,348 and 1,262,441 and U.S.A. Pat. Nos. 2,195,974, 2,051,004 and 2,921,945.

Suitable anthraquinone dyestuffs are for example those in which one or more carboxyl groups are located in the anthraquinone molecule itself or in aryl or alkyl radicals which are bound to the anthraquinone molecule through bridge members, for example amino, ether, thioether, sulphonamide or sulphonylamino groups. As anthraquinone compounds, the following may be mentioned: 1,4-diamino-2-carboxyanthraquinone, 1-hydroxy-4-amino-2-carboxyanthraquinone, 1,4-dihydroxy-2-carboxyanthraquinone, 1-amino-2-carboxyanthraquinone, 1,4-diamino-2,3-dicarboxyanthraquinone and also acylation products of aminoanthraquinones with

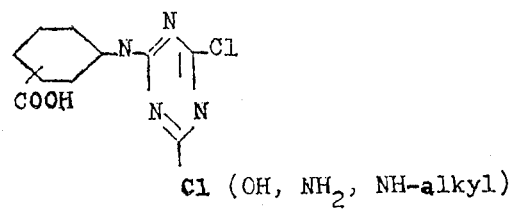

Cl (OH, NH₂, NH-alkyl)

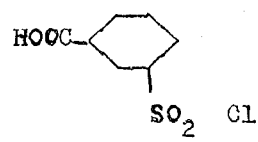

c. HOOC-X-COOH

X = aryl, alkyl, or a heterocyclic residue.

Suitable aminoanthraquinones are the following compounds: 1,4-diamino-2-(alkoxy- or aryloxy)-anthraquinone, 1,8-dihydroxy-4,5-diaminoanthraquinone, 1,5-diamino-4-hydroxyanthraquinone, 1-aminoanthraquinone, 1-amino-4-methoxyanthraquinone, 1,4-β-hydroxyethylamino-5,8-dihydroxyanthraquinone, 1,4,8-triamino-5-hydroxyanthraquinone, 1,4,5,8-tetraminoanthraquinone, 1-hydroxy-4-aminoanthraquinone, 1,4-dihydroxy-2-aminoanthraquinone, 1-amino-4-(p-aminophenylamino)-anthraquinone, 1,4-dihydroxy-2-aminoanthraquinone and 1,4-diaminoanthraquinone.

Amongst the anthraquinone condensation products containing carboxyl groups, which contain more than three fused rings, the following may for example be mentioned:

Isothiazolanthrones, for example

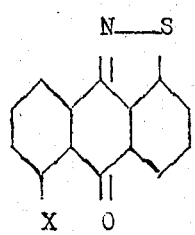

X = S-alkyl-COOH, NH-alkyl-COOH, S-aryl-COOH, NH-aryl-COOH

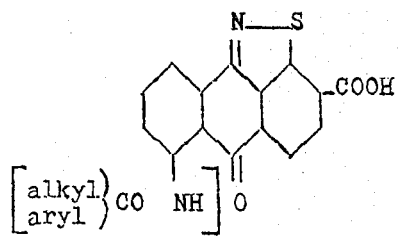

Pyrazolanthrones, for example

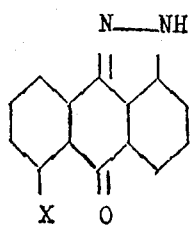

X = S-alkyl-COOH, NH-alkyl-COOH, S-aryl-COOH, NH-aryl-COOH

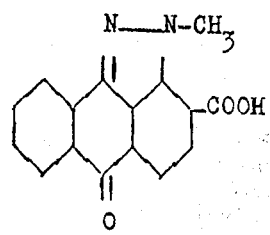

and also the dyestuffs of the type

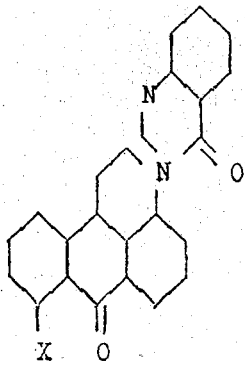

X = S-alkyl-COOH, NH-alkyl-COOH, S-aryl-COOH, NH-aryl-COOH

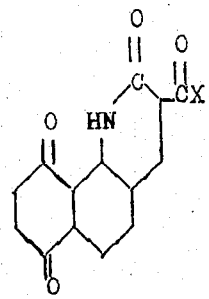

X = NH-alkyl-COOH, NH-aryl-COOH

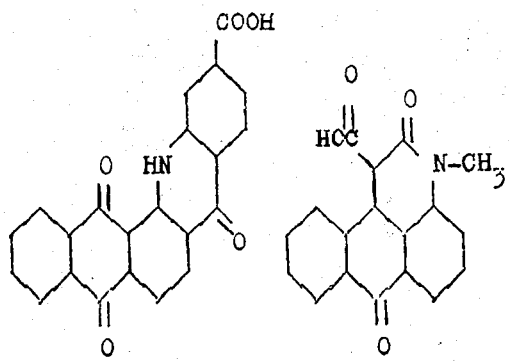

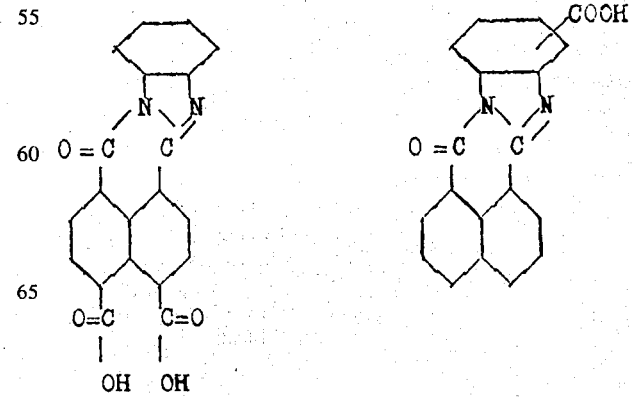

Anthraquinone dyestuffs of the formulae indicated may be manufactured according to the principles of synthesis known in anthraquinone chemistry. For this purpose, condensation reactions with suitable starting products are advantageously used, for example anthraquinone compounds containing amino groups in which the amino groups are either in a side chain but preferably in a nuclear-bound position may be condensed with suitable carboxyaryl acid halides or anhydrides, for example carboxyphenyl- or carboxynaphthyl-sulphonic acid or -carboxylic acid chlorides or bromides to form the corresponding acid amides, or for example, anthraquinone compounds containing mobile halogen atoms, for example 1-amino- or 1-substituted-amino-4-bromoanthraquinone-2-sulphonic acids may be reacted with carboxyarylamines, for example carboxyphenylamines or carboxynaphthylamines to form the corresponding carboxyarylamino-anthraquinone derivatives. Anthraquinone-ether and anthraquinone-thioether derivatives in which the carboxyl groups are contained in alkyl, aralkyl or aryl radicals of the ether or thioether residue can be manufactured according to similar principles of synthesis. A further suitable synthesis for anthraquinone dyestuffs containing carboxyl groups to be used according to the invention, is to convert an anthraquinone acid halide, for example carboxylic acid and sulphonic acid chlorides or bromides with suitable amino or hydroxy compounds, which additionally contain at least one carboxylic acid group, into the corresponding amides or esters. Of course, those anthraquinone compounds in which one or more carboxyl groups are in a nuclear-bound position or in which both nuclear-bound and externally bound carboxyl groups are present may be used in the present process.

Suitable azaporphone dyestuffs containing carboxyl groups may for example be synthesised by condensing metalphthalocyanine sulphonic acid halides, especially copper- and nickel-Pc-sulphonic acid halides, or chloromethyl-substituted phthalocyanine dyestuffs, with aminoarylcarboxylic acids, aminoaralkylcarboxylic acids or aminoalkylcarboxylic acids.

Diarylamine dyestuffs containing carboxyl groups may also be manufactured by condensation of the corresponding starting compounds, for example carboxylarylamines.

The padding liquor should as a rule be aqueous. In addition to the dyestuff it can also contain further auxiliary agents when required, for example sodium salts of highly condensed naphthalene sulphonic acid-formaldehyde resins, sulphite cellulose waste lye products, condensation products of higher alcohols with ethylene oxide, polyglycol ethers of fatty acid amides and alkylphenols, sulphosuccinic acid esters or Turkey red oil. The padding liquor can however also be a solution of the dyestuff.

After squeezing the material to 20 to 200% by weight of the fibre weight, the textile material is dried. Drying can for example be carried out with steam or preferably in a current of warm air between 70° and 150°C for 10 to 300 seconds.

The fabric is then printed with an alkaline printing paste which contains a heat-resistant alkaline compound, for example an alkali metal carbonate, for example sodium carbonate or potassium carbonate, or especially an alkali hydroxide, for example sodium or potassium hydroxide. The amount of the alkali must be so chosen that the dyestuff present on the fibre is completely converted into the alkali metal salt. When the reserved area is to remain white, the reserve paste can contain white pigments, for example titanium oxide or zinc oxide. The printing paste may also contain the usual additives, for example thickeners, for example gum arabic or methyl cellulose.

In order to produce two-colour prints, dyestuffs which are resistant to alkali, especially disperse dyestuffs, should be added to the printing paste. These dyestuffs must not contain any carboxyl groups.

These disperse dyestuffs may be illustrated by reference to the dyestuffs containing carboxyl groups which have been recited above, when hydrogen atoms for example are substituted for the carboxyl groups in the given formulae.

Other disperse dyestuffs suitable for the alkaline printing pastes and reserve pastes are, for example the azo dyestuffs obtained from the above mentioned diazo components which are free of carboxyl groups and any desired coupling components.

Amongst the coupling components of the benzene series apart from the phenols, for example m- or p-cresol, resorcinol or 1-hydroxy-3-cyanomethylbenzene, the following may be especially mentioned: the aminobenzenes, for example aniline, 3-methylaniline, 2-methoxy-5-methylaniline, 3-acetylamino-1-aminobenzene, N-methylaniline, N-$\beta$-hydroxyethylaniline, N-$\beta$-methoxyethylaniline, N-$\beta$-cyanoethylaniline, N-$\beta$-chloroethylaniline, dimethylaniline, diethylaniline, N-methyl-N-(benzyl-or $\beta$-phenylethyl)-aniline, N-n-butyl-N-$\beta$-chloroethylaniline, N-(methyl-, ethyl-, propyl- or butyl)-N-$\beta$-cyanoethylaniline, N-methyl-N-$\beta$-hydroxyethylaniline, N-ethyl-N-$\beta$-chloroethylaniline, N-methyl-N-$\beta$-acetoxyethylaniline, N-ethyl-N-$\beta$-methoxyethylaniline, N-$\beta$-cyanoethyl-N-$\beta$-chloroethylaniline, N-cyanoethyl-N-(acetoxy- or benzoyloxyethyl)-aniline, N,N-di-$\alpha$-hydroxyethylaniline, N,N-di-$\beta$-acetoxyethylaniline, N-ethyl-N,2-hydroxy-3-chloropropylaniline, N,N-di-$\beta$-cyanoethylaniline, N,N-di-$\beta$-cyanoethyl-3-methylaniline, N-$\beta'$-cyanoethyl-N-$\beta''$-hydroxyethyl-3-chloroaniline, N,N-di-$\beta$-cyanoethyl-3-methoxyaniline, N,N-dimethyl-3-acetylaminoaniline, N-ethyl-N-$\beta$-cyanoethyl-3-acetylaminoaniline, N,N-di-$\beta$-cyanoethyl-2-methoxy-5-acetylaminoaniline, N-methyl-N-phenacylanilines, N-$\beta$-cyanoethyl-2-chloroaniline, N,N-diethyl-3-trifluoromethylaniline, N-ethyl-N-phenylaniline, diphenylamine, N-methyldiphenylamine, N-methyl-4-ethoxydiphenylamine or N-phenylmorpholine, and also, for example, amines of the formula

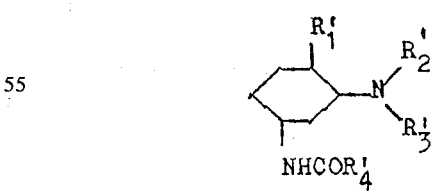

wherein $R_1'$ denotes a hydrogen atom or an alkyl or alkoxy group, $R_2'$ denotes a cyanoalkoxyalkyl group, $R_3'$ denotes a hydrogen atom, a cyanoalkoxyalkyl group or an acyloxyalkyl group and $R_4'$ denotes a hydrogen atom, an optionally substituted alkyl, cycloalkyl or alkoxy group or a benzene radical, and especially those of the formula

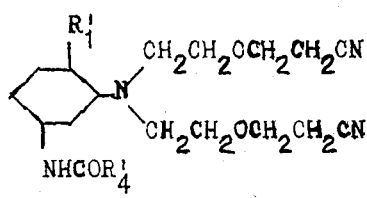

wherein $R_1'$ and $R_4'$ have the significance indicated.

Particularly valuable results are again obtained with coupling components of the formulae

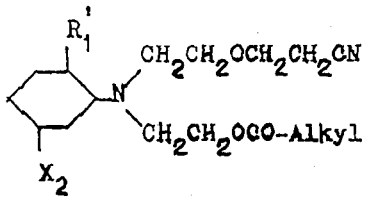

and

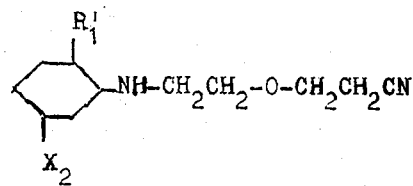

wherein $R_1'$ has the significance indicated and $X_2$ denotes an acylamino group, and wherein alkyl for example denotes a methyl, ethyl or propyl group.

As such examples, the following coupling components may be mentioned:

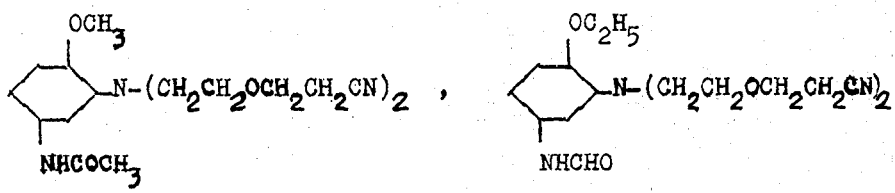

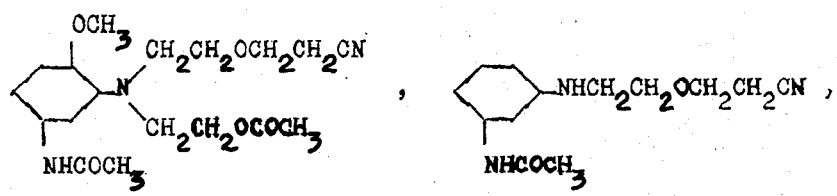

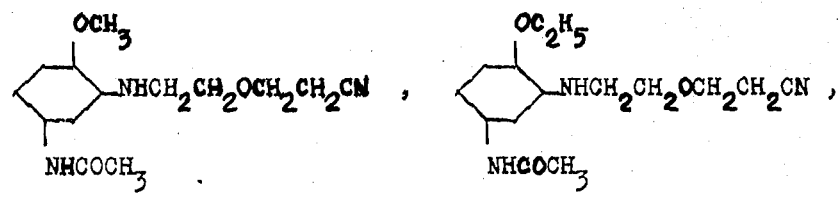

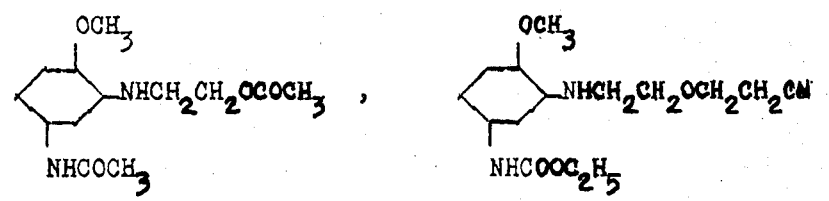

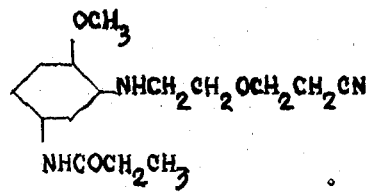

From the series of the coupling components of the naphthalene series apart from the naphthols, the following may for example be mentioned: 1- or 2-naphthylamine as well as 2-phenylaminonaphthalene, 1-dimethylaminonaphthalene or 2-ethylaminonaphthalene. From the series of the heterocyclic coupling components the following may for example be mentioned: the indoles, for example 2-methylindole, 2,5-dimethylindole, 2,4-dimethyl-7-methoxyindole, 2-phenyl- or 2-methyl-5-ethoxyindole, N,β-cyanoethyl-2-methylindole, 2-methyl-5- or -6-chloroindole, 1,2-dimethylindole, 1-methyl-2-phenylindole, 2-methyl-5-nitroindole, 2-methyl-5-cyanoindole, 2-methyl-7-chloroindole, 2-methyl-5-fluoro or -5-bromoindole, 2-methyl-5,7-dichloroindole or 2-phenylindole, 1-cyanoethyl-2,6-dimethylindole; pyridines, for example 3-cyano-2,6-dihydroxy-4-methylpyridine, and also pyrazoles, for example 1-phenyl-5-aminopyrazole or 3-methylpyrazolone-5 or 1-phenyl-3-methylpyrazolone-5, 1,3-dimethylpyrazolone-5, 1-butyl-3-methylpyrazolone-5, 1-hydroxyethyl-3-methylpyrazolone-5, 1-cyanoethyl-3-methylpyrazolone-5, 1-(o-chlorophenyl)-3-methylpyrazolone-5 and 3-carbomethoxypyrazolone-5; quinolines, for example 8-hydroxyquinoline, 1-methyl-4-hydroxyquinoline-2, N-ethyl-3-hydroxy-7-methyl- or N,β-cyanoethyl-1,2,3,4-tetrahydroquinoline or pyrimidines for example barbituric acid, as well as 1,3-indanedione, 1,8-naphthindadione or dimedone. Furthermore, optical brighteners which possess an affinity for the organic fabric (for example nylon and particularly cellulose acetate and polyester fabric) can be introduced into the alkaline printing paste. In addition to a dispersion dyestuff free from carboxyl groups, the printing paste can also contain dyestuffs of other categories, for example water-soluble or water-insoluble dyestuffs having fibre-reactive groups, for example dichlorotriazine or monochlorotriazine groups, chloroacetylamino groups and acrylamide groups. The use of water-soluble fibre-reactive dyestuffs is of particular interest in those cases where mixed fabrics containing cellulose or wool, especially mixed fabrics with polyester fibres, are used as the substrate. When printing pastes containing fibre-reactive dyestuffs are used, the alkali treatment can be adapted to the modern methods for fixing reactive dyestuffs (for example alkali shock treatment).

Furthermore, optical brighteners can also be used as dyestuffs for the printing.

After printing, the textile material can be dried either with steam or with hot air or can be subjected to fixing as it is.

The fixing of the dyestuff or dyestuffs on the textile material takes place by heating at 100° to 260°C, preferably 150° to 230°C, but it should be carried out at lower temperatures for polymers of low softening point, preferably using dry heat (thermosol process) in devices suitable for this purpose. Superheated steam may also be used. Prints on polypropylene should be thermofixed at temperatures below 140°C.

After fixing, the printed material is washed. This can be carried out both in an organic and, preferably, in an aqueous liquor. The usual surface-active agents, for example the above mentioned auxiliary agents may be used for this purpose.

In the Examples which follow the parts, unless otherwise stated, denote parts by weight and the percentages denote percentages by weight.

EXAMPLE 1

133 Parts of a 10% paste of the dyestuff 4-carboxy-4'-(dihydroxyethylamino)-2'-chloroazobenzene, 200 parts of 2.5% sodium alginate solution, and 1.5 parts by volume of 40% acetic acid are made up to 1000 parts with water. A polyester fabric is padded with this liquor and squeezed to about 75%. The fabric is dried for one minute at 120°C and a part of the dried fabric is printed with a white reserve as follows: a paste of 20 parts of sodium carbonate and 950 parts of 2.5% sodium alginate solution is printed onto the fabric. The fabric is thermo-fixed for one minute at 200°C as it is, and is subsequently thoroughly washed with a solution which contains the adduct of 9 mols of ethylene oxide to 1 mol of nonylphenol. An orange-coloured fabric with a white reserve is obtained.

When the reserve paste consists of 3% of the disperse dyestuff 1,4-diamino-5-nitroanthraquinone, 2% of soda and 95% of sodium alginate solution (2.5%) and in other respects the above procedure is followed, an orange-violet striped fabric is obtained.

The printing paste can be mixed with additives for example aluminium secondary-butylate or m-nitrobenzene sulphonate.

EXAMPLE 2

A polyester fabric is padded with an aqueous liquor which contains 133 parts of the dyestuff containing a carboxyl group mentioned in Example 1, 30 parts of 1,4-diamino-5-nitroanthraquinone and 200 parts of 2.5% sodium alginate solution in 1000 parts, squeezed to 75% of the fibre weight and dried. The fabric is subsequently printed in stripes with the colourless reserve paste indicated in Example 1 and thereafter thermo-fixed for 1 minute at 200°C.

The fabric is subsequently washed with a soap solution containing sodium carbonate and dried. A fabric displaying olive-green and violet stripes is obtained.

EXAMPLE 3

A fabric of cellulose triacetate is padded as in Example 1 using the dyestuff 2-carboxy-4-nitro-2'-acetamido-4'-(cyanoethyl-methoxyethylamino)-azobenzene, dried and printed with a colourless alkaline paste as in Example 1, thermo-fixed at 200°C and finally washed in the presence of alkali. A violet-red fabric with a reserve pattern is obtained.

EXAMPLE 4

100 Parts of polyester fabric are padded with a solution of 8 parts of the dyestuff of the formula

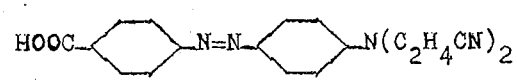

in 1000 parts of dimethyl sulphoxide, squeezed to 60% of the fibre weight and dried for 1 minute at 100°C in a current of hot air. The dried fabric is then printed with a printing paste which in addition to sodium alginate contains 20 parts of sodium carbonate and 100 parts of zinc oxide in 1000 parts of paste. The printed fabric is then dried as above and thermo-fixed for 1 minute at 200°C. After soaping with a solution of 2 g/l of hydrosulphite, 2 g/l of 35% sodium hydroxide solution and 2 g/l of a fatty amine-polyethylene adduct at 80°C, the material is rinsed with water. A white pattern on a yellow background is obtained.

EXAMPLE 5

The above procedure is followed but the alkaline printing paste also contains the dispersed dyestuff 1,4-diamino-5-nitroanthraquinone. A violet pattern on a yellow background is thus obtained.

EXAMPLE 6

Three pieces of polyester fabric are each padded with a liquor which contains 120 g/l of one of the three dyestuffs containing carboxyl groups mentioned in Examples 1, 3 and 4, 100 g/l of 12% sodium alginate solution and 2 g/l liter of 40% acetic acid, squeezed to about 55% of the fibre weight, and dried at 80° to 100°C in a drying cabinet.

The dried fabric is printed in stripes with a white reserve which consists of 40 g/kg of sodium hydroxide solution (36° Be), 200 g/kg of Rongalite C (formaldehydesodium sulphoxylate), 260 g/kg of water and 500 g/kg of a 10% aqueous solution of carboxymethyl cellulose (Solvitose C 5).

Instead of the white reserve, a coloured reserve may also be used which consists of 10 g/kg of 36° Be sodium hydroxide solution, 440 g/kg of water and 550 g/kg of a 10% aqueous solution of carboxymethyl cellulose (Solvitose C 5), and into which the finely ground dyestuff free from carboxyl groups is sprinkled, for example the anthraquinone dyestuff indicted above in Example 1.

Fabrics printed in stripes are obtained, having the same shades as in the preceding examples.

Instead of the dyestuffs named in Examples 1, 3 and 4, the following dyestuffs containing carboxyl groups may also be used. They yield on polyester fabrics the shades indicated when the fabrics are printed with a white reserve:

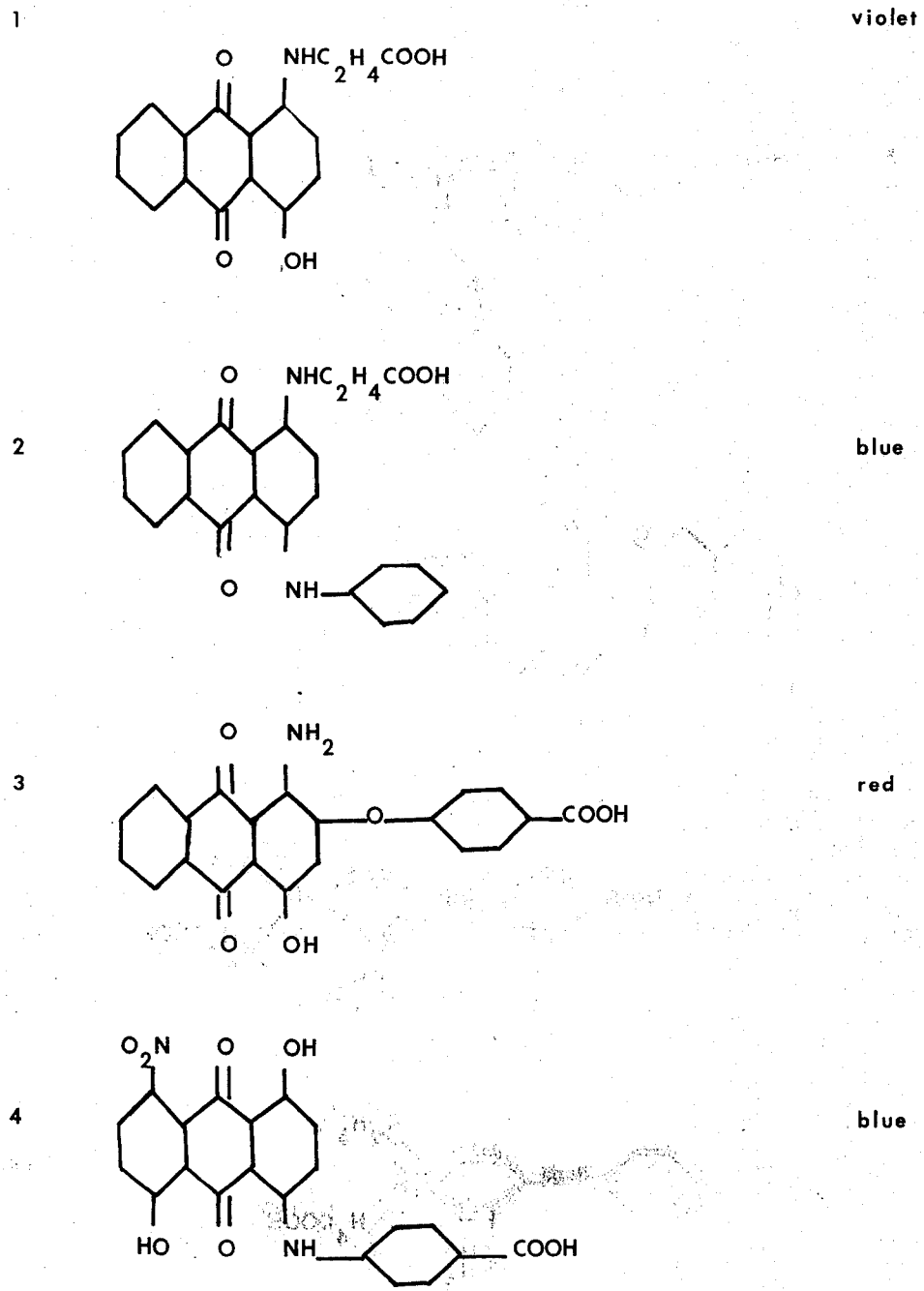

| | | |
|---|---|---|
| 5 | 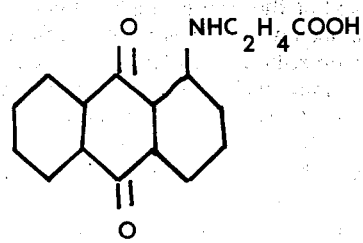 | red |
| 6 | 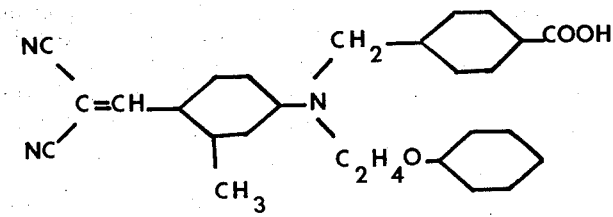 | green-yellow |
| 7 | 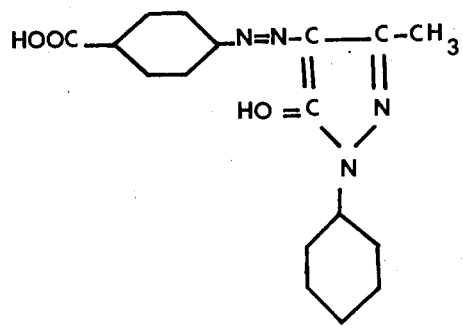 | yellow |
| 8 | 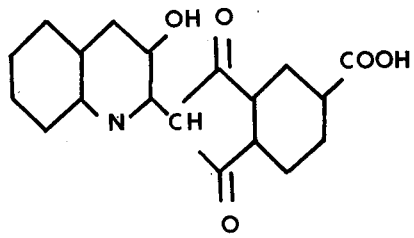 | yellow |
| 9 | 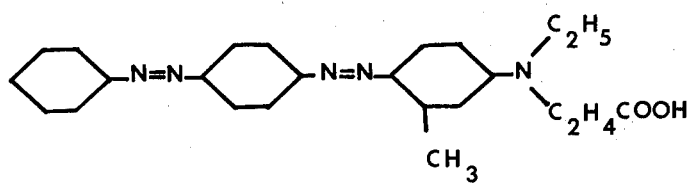 | scarlet |
| 10 | 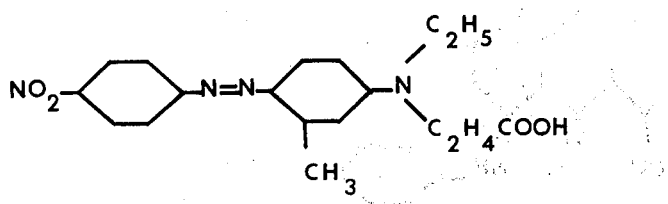 | red |

11 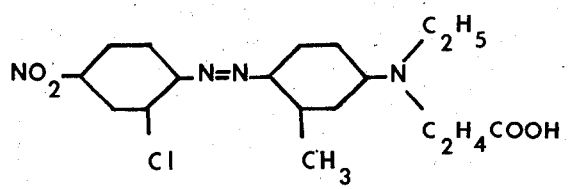 red

12 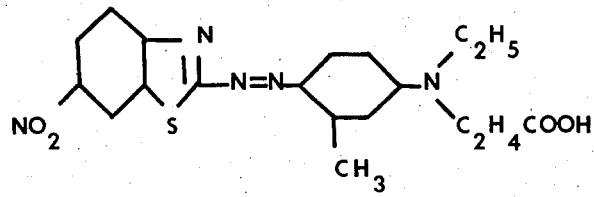 violet

13 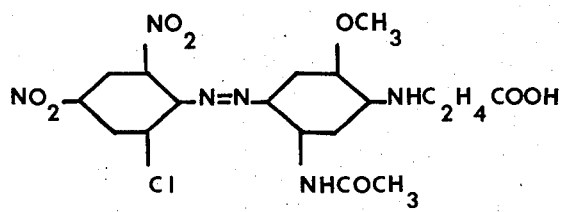 blue

14 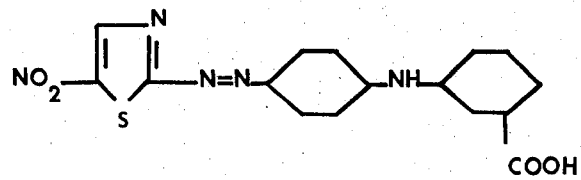 blue-red

EXAMPLE 7

A fabric of unmodified polypropylene is padded as in Example 6, dried and printed with a white reserve, but the compound of the formula

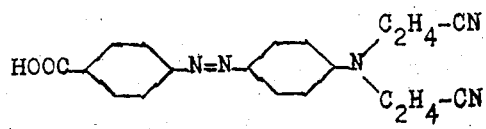

is used as the dyestuff. The fabric is thermo-fixed for 2 minutes at 150°C. A yellow striped pattern with a white reserve is obtained.

EXAMPLE 8

A polyester fabric is padded with 14 parts of the dyestuff of the formula

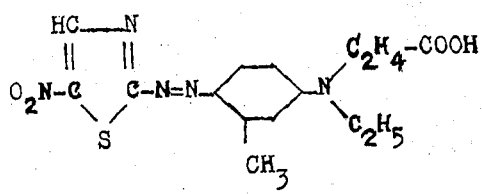

which is dispersed in 1000 parts of water, dried for 1 minute at 120°C in a stream of warm air, and printed with a pattern. For this purpose, a printing solution thickened with sodium alginate is used which contains 50 g/l of titanium dioxide (Rutile), 40 g/l of sodium carbonate and 50 g/l of magnesium carbonate. The fabric is dried as previously, thermo-fixed for 1 minute at 190°C, first washed with water and then passed through a bath containing 5 g/l of sodium hydrosulphite and 10 g/l of sodium hydroxide solution (36° Be). The fabric is then dried. It displays a white pattern on a blue background.

We claim:

1. A process for dyeing and printing textile material made of or containing fully synthetic hydrophobic linear polymers which are free from amino groups, comprising the steps of
    1. padding the material with a dispersion dyestuff containing at least one carboxyl group and no sulfonic acid groups,
    2. drying the padded textile material,
    3. printing the dried textile material with a printing paste which contains heat-resistant alkaline compound as the only chemically reactive component, whereby the carboxyl-group-containing dyestuff forms a salt with the alkaline compound,
    4. heating the textile material to fix the unreacted dyestuff thereon, and
    5. washing the textile material to remove the dyestuff salt from the printed areas.

2. A process as claimed in claim 1, wherein textile material of cellulose triacetate staple fibres, polyester fibres or polypropylene fibres is padded and printed.

3. A process as claimed in claim 2, wherein textile material of polyesters is padded and printed.

4. A process as claimed in claim 2, wherein textile material of polypropylene is dyed and printed.

5. A process as claimed in claim 1, wherein the printing paste contains an excess of alkali calculated on the amount of carboxylic groups present in the dyestuff.

6. A process as claimed in claim 7, wherein the printing paste contains an alkali metal hydroxide.

7. A process as claimed in claim 1, wherein a printing paste which contains an optical brightener stable towards alkali is used.

8. A process as claimed in claim 1, wherein a printing paste that contains a disperse dyestuff free of acidic groups and stable towards alkali is used.

9. A process as claimed in claim 1, wherein a polyester cellulose mixed fabric is printed with a printing paste which contains a fibre-reactive water-soluble dyestuff.

10. A process as claimed in claim 2, wherein the printed fabric is heated at 150° to 230°C.

11. A process as claimed in claim 10, wherein the printed fabric is heated with superheated steam.

12. A process as claimed in claim 10, wherein the printed fabric is thermo-fixed.

* * * * *